(12) United States Patent
Stewart et al.

(10) Patent No.: US 11,848,469 B2
(45) Date of Patent: Dec. 19, 2023

(54) CLAMPING SYSTEM FOR FUEL CELL STACK, AND FUEL CELL SYSTEM COMPRISING SUCH A CLAMPING SYSTEM

(71) Applicants: AUDI AG, Ingolstadt (DE); VOLKSWAGEN AG, Wolfsburg (DE)

(72) Inventors: Ian Stewart, Burnaby (CA); Campbell Perry, Burnaby (CA); Amy Warkentin, Burnaby (CA)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 290 days.

(21) Appl. No.: 16/982,922

(22) PCT Filed: Mar. 4, 2019

(86) PCT No.: PCT/EP2019/055277
§ 371 (c)(1),
(2) Date: Sep. 21, 2020

(87) PCT Pub. No.: WO2019/179754
PCT Pub. Date: Sep. 26, 2019

(65) Prior Publication Data
US 2021/0013537 A1 Jan. 14, 2021

(30) Foreign Application Priority Data
Mar. 22, 2018 (DE) .................... 10 2018 204 363.9

(51) Int. Cl.
*H01M 8/248* (2016.01)
(52) U.S. Cl.
CPC ........ *H01M 8/248* (2013.01); *H01M 2250/20* (2013.01)

(58) Field of Classification Search
CPC .......................... H01M 8/248; H01M 2250/20
See application file for complete search history.

(56) References Cited

U.S. PATENT DOCUMENTS

| | | | | |
|---|---|---|---|---|
| 6,663,996 B2* | 12/2003 | Gibb | ............. | H01M 8/247 429/511 |
| 2002/0034673 A1* | 3/2002 | Bisaka | ............. | H01M 8/2484 429/454 |
| 2008/0166598 A1* | 7/2008 | Mahlanen | ............. | F16F 13/002 429/434 |
| 2009/0004533 A1* | 1/2009 | Tanaka | ............. | H01M 8/2483 429/481 |

(Continued)

FOREIGN PATENT DOCUMENTS

| | | |
|---|---|---|
| DE | 102 13 558 A1 | 11/2002 |
| DE | 102 24 962 A1 | 2/2003 |

(Continued)

OTHER PUBLICATIONS

Machine translation of JP-2007005169-A (Year: 2007).*

*Primary Examiner* — Milton I Cano
*Assistant Examiner* — Mary G Henshaw
(74) *Attorney, Agent, or Firm* — Seed IP Law Group LLP

(57) ABSTRACT

A fuel cell system comprises a clamping system for a fuel cell stack, the clamping system including a plurality of disc springs. The disc springs are connected together in a bonded and/or force-fitting manner on a plane perpendicular to an axis of rotational symmetry running through the center of the circle described by the disc.

10 Claims, 5 Drawing Sheets

(56) References Cited

U.S. PATENT DOCUMENTS

| | | | | |
|---|---|---|---|---|
| 2009/0220848 | A1* | 9/2009 | Yang | H01M 8/0204 |
| | | | | 429/444 |
| 2011/0123882 | A1* | 5/2011 | Kim | H01M 8/248 |
| | | | | 429/428 |
| 2014/0060143 | A1 | 3/2014 | Son et al. | |
| 2014/0099566 | A1* | 4/2014 | Domit | H01M 8/04201 |
| | | | | 429/482 |
| 2018/0145366 | A1* | 5/2018 | Bach | H01M 8/248 |

FOREIGN PATENT DOCUMENTS

| | | |
|---|---|---|
| DE | 10 2012 219 022 A1 | 4/2014 |
| JP | 2007005169 A * | 1/2007 |
| WO | 99/27602 A1 | 6/1999 |

* cited by examiner

CLAMPING SYSTEM FOR FUEL CELL STACK, AND FUEL CELL SYSTEM COMPRISING SUCH A CLAMPING SYSTEM

BACKGROUND

Technical Field

Embodiments of the invention relate to a clamping device for compressing individual cells of a fuel cell stack. Embodiments of the invention also relate to a fuel cell system with the clamping device.

Description of the Related Art

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (usually proton-conducting) membrane and of a catalytic electrode (anode and cathode), respectively arranged on both sides of the membrane. The latter generally comprise supported precious metals, in particular platinum. In addition, gas diffusion layers (GDL) can be arranged on both sides of the membrane electrode assembly, on the sides of the electrodes facing away from the membrane. Usually, the fuel cell is formed by a plurality of MEAs which are arranged in a stack (fuel cell stack) and whose electrical power outputs accumulate. Between the individual membrane electrode assemblies, bipolar plates (also called flow-field plates or separator plates) are usually arranged, which ensure a supply of the individual cells with the operating media, i.e., the reactants, and are usually also used for cooling. In addition, the bipolar plates also ensure an electrically conductive contact to the membrane electrode assemblies.

While the fuel cell is in operation, the fuel (anode operating medium), in particular hydrogen $H_2$ or a hydrogen-containing gas mixture, is supplied via an anode-side open flow-field of the bipolar plate to the anode where electrochemical oxidation of $H_2$ into protons $H^+$ occurs with the release of electrons ($H_2 \rightarrow 2\ H^+ + 2\ e^-$). Protons are transported (in a water-bound or water-free manner) from the anode chamber into the cathode chamber across the electrolyte or membrane that separates and electrically insulates the reaction chambers in a gas-tight manner from each other. The electrons provided at the anode are guided to the cathode via an electrical line. Oxygen or an oxygen-containing gas mixture (such as air) as the cathode operating medium is supplied to the cathode via a cathode-side open flow-field of the bipolar plate so that a reduction of $O_2$ to $O^{2-}$ occurs with gain of electrons ($\frac{1}{2}\ O_2 + 2\ e^- \rightarrow O^{2-}$). At the same time, the oxygen anions in the cathode chamber react with the protons transported across the membrane with formation of water ($O^{2-} + 2\ H^+ \rightarrow H_2O$).

At its opposite stack ends, the fuel cell stack typically has end plates, which are connected to each other by clamping devices as part of a clamping system. The clamping devices transmit tensile forces which pull the end plates toward each other and press the individual cells arranged between them, i.e., press them against each other.

In order to transmit the clamping force uniformly to the stack and to avoid damage to the latter, the clamping system comprises a spring system in addition to the clamping device.

DE 102 13 558 A1 and US 2014/0060143 A1 disclose the use of disk springs in a clamping system for a fuel cell stack. A plurality of conical disk springs is arranged between an end plate and a support plate of the fuel cell system.

A disk spring is in the form of the lateral surface of a flat truncated cone or spherical segment. It is elastically compressed between its peripheral circles (theoretically maximally until it is deformed into a planar disk), wherein normal stresses (compressive and tensile stresses) form in the material in response to the forces introduced.

The individual disk spring is a relatively stiff spring and is accordingly used where such a spring is required. A softer spring is produced by stacking up the disks alternately ("series connection"). A spring which is stiffer than the individual spring is produced by stacking up the disks unidirectionally ("parallel connection").

Both the force and the spring travel can be multiplied by stacking to form a disk-spring column.

The use of disk springs in a clamping system for a fuel cell stack leads to a comparatively non-uniform distribution of the force over the surface of a fuel cell or of the fuel cell stack. Moreover, such a clamping system is sensitive to errors in the arrangement and number of individual springs. An erroneous arrangement of the springs, within the range of very low fault tolerance, or an incorrect alignment of at least one of the springs used, leads to a strong punctiform load on the fuel cell stack and frequently to fracturing or at least to damage of individual fuel cells.

BRIEF SUMMARY

Embodiments of the invention are based on the object of solving or at least reducing the problems of the prior art. Furthermore, a fuel cell system is to be provided which is optimized with regard to a mass/yield ratio.

This object is achieved by a clamping system as well as a fuel cell stack having the features of the embodiments described herein. A first aspect thus relates to a clamping system for a fuel cell stack, comprising a plurality of disk springs, wherein the disk springs have a bonded and/or force-fitting connection in the disk plane, i.e., in a plane perpendicular to a rotational axis running through the center of the circle described by the disks. The connection of the disk springs leads firstly to a fixing of the springs and thus to a more reliable uniform distribution of the springs on a surface, in particular the base surface of a fuel cell stack. In addition, a homogeneous distribution of force over the plane takes place via the bonded and/or force-fitting connection. Disk springs of the same number and thickness in the embodiments described herein thus have a greater spring force and in particular a greater stability than in comparable known arrangements. Conversely, in the clamping systems described herein, less material is necessary for the same desired spring force since the springs do not need to be so thick, which in turn leads to a design of the clamping system that is lighter in comparison to the prior art. The use of a clamping system as described herein in a fuel cell stack thus improves the power density relative to the weight of the fuel cell system.

In the present document, the term "bonded connections" also refers to integral connections.

In addition, force is transmitted to the fuel cell stack over a larger area, is thus more homogeneous, and in turn leads to less load on the stack. Moreover, the arrangement of the disk springs in the clamping systems described herein have production advantages since fewer work steps are required for placing a plurality of disk springs in the fuel cell stack and these disk springs impose lower requirements for dimensional accuracy in the production process.

In some embodiments, the disk springs are arranged in the form of a package. In this case, the package comprises a layer, i.e., a plurality of springs connected in the plane defined above. A package advantageously comprises or consists of a layer of disk springs, i.e., all disk springs arranged within a layer on a fuel cell stack. Alternatively, 2 or 4 packages are arranged in one layer so that a package comprises correspondingly fewer disk springs. This embodiment as a package increases reproducibility with respect to the arrangement of the springs relative to one another and in particular with regard to their position when arranged in a fuel cell stack.

The springs advantageously have an outer diameter in the range of 3 to 20 mm, particularly in the range of 5 to 15 mm, and are thus significantly smaller than the disk springs with a diameter of 5 to 6 cm typically used in the prior art. The thickness of the material used may be in the range of 0.05 to 2 mm, in particular in the range of 0.1 to 0.8 mm. These ranges show an optimized ratio between weight and stability.

When arranged in packages, 4 to 6 springs are advantageously installed per package and arranged in such a way that a base surface of a package is rectangular, in particular square, and substantially corresponds to the base surface of a fuel cell or of the fuel cell stack. All this leads to less material with the same spring force.

The plurality of disk springs used in the clamping system may be designed integrally in one piece, i.e., the disk springs connected to one another are particularly advantageously connected to one another via a bonded, in particular integral, connection. This has the advantage that the plurality of disk springs, in particular a package, can be produced from a single piece of flat material, for example by stamping and/or bending the material layer. Alternatively, the plurality of disk springs, in particular the package, is cast, in particular injection-molded.

In an embodiment of an integrally one-piece or flat connection of the plurality of disk springs, a layer or a package may be stamped out of a material layer and/or produced by shaping a material layer. This offers a production advantage and improved stability and durability of the connections.

In some embodiments, the connection between adjacent springs is designed as a web or as a flat, in particular full-surface, connection. The connection via webs leads to a further material saving and thus to less weight, wherein a flat, in particular a full-surface, connection is more rigid and more stable.

If the springs are connected to each other by webs, one disk spring may be connected in each case to 4 and/or 6 springs, which leads to a rectangular or hexagonal arrangement of the springs. The webs form regular triangles with the centers of the disk springs as corner points. The connection with 4 disk springs each may be used in the case of a greater distance between the disk springs and in particular in the case of a lower packing density. Such arrangements and connections represent a highly regular and optimal utilization of space in a layer, which leads to high stability and homogeneity of force transmission when arranged in a fuel cell stack.

In the present document, web-like connections are to be distinguished from flat connections in particular by the ratio of connected surface to free surface or to material surface. In web-like connections, the material surface between the disk springs is smaller than the area of the recesses in the material.

The distance between adjacent disk springs may be in the range of 40 to 70%, particularly in the range of 45 to 67% of the outer diameter of one of the disk springs. In particular, the edge regions of 45% (short flange) or 67% (long flange) of the outer diameter of a disk spring have proven to be particularly advantageous with respect to a material/force ratio.

The clamping system particularly advantageously has several layers of connected disk springs, which are arranged one above the other. The disk springs can be arranged vertically one above the other or offset from one another from layer to layer. The latter embodiment offers the advantage that the force which is transmitted to the fuel cells by the clamping elements of the clamping device, for example when used in a fuel cell stack, is distributed more homogeneously over the base surface of the fuel cell stack.

The layers may be arranged in relation to one another in such a way that the springs of layers arranged one above the other are aligned congruently, i.e., in particular lie vertically one above the other. In this case, the above-described known columnar packages of several disk lenses are formed with the known advantages.

The springs of layers arranged one above the other may also be aligned at least partially unidirectionally. In the present document, a distinction is to be made between unidirectional and alternate alignment in a stack or in a layer of adjacent disk springs, wherein the term "unidirectional alignment" refers to disk springs which are convex in the same direction and the term "alternating alignment" accordingly refers to an opposite alignment of adjacent disk springs.

The convexity of the disk springs may be conical or else like a spherical segment, in particular hemispherical. Conical, i.e., frustoconical, convexities may be used since they are stiffer than the alternative embodiments. It has been shown that a force/deflection diagram has a curve that differs from spherical disk lenses and has an advantageous effect on the use in a fuel cell stack.

A further aspect is a fuel cell stack and a fuel cell system comprising a clamping system as described herein. Such fuel cell stacks or fuel cell systems have a better weight-to-yield ratio and are also more fracture-resistant.

The plurality of disk springs may be separated by stamping, laser-cutting or water-jet cutting, thereby providing the most efficient separation methods for the respective quantities required.

Aspects of the various embodiments mentioned in this application may be combined advantageously with one another unless stated otherwise in individual cases.

BRIEF DESCRIPTION OF THE SEVERAL VIEWS OF THE DRAWINGS

Embodiments of the invention are explained below with reference to the respective drawings. The following is shown.

DETAILED DESCRIPTION

Figure 1:
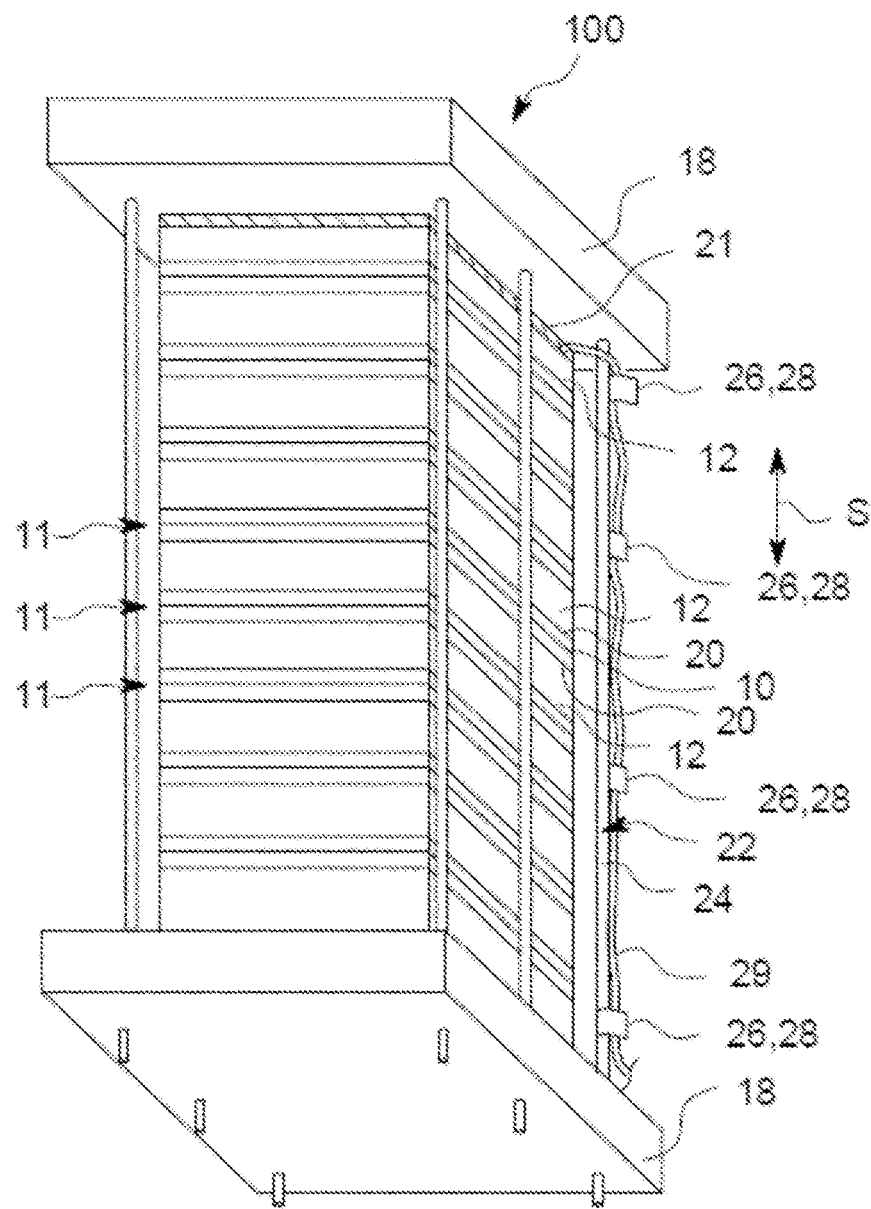
FIG. 1 illustrates a schematic representation of a fuel cell stack.

FIG. 1 shows a schematic representation of a fuel cell stack, denoted as a whole by 100, according to one embodiment. The fuel cell stack 100 is part of a vehicle (not shown in more detail), in particular an electric vehicle, which has an electric traction motor, which is supplied with electrical energy by the fuel cell stack 100.

The fuel cell stack 100 comprises a plurality of membrane electrode assemblies 10 and polar plates 12 alternatingly arranged (stacked) next to each other on their flat sides. Overall, several stacked individual cells 11 thus form the fuel cell stack 100, wherein both one of the individual cells 11 and the fuel cell stack 100 can generally be called a fuel cell.

The polar plates 12 may take the form of bipolar plates if they are arranged between membrane electrode assemblies 10. The two polar plates 12 which are arranged between the membrane electrode assemblies 10 and the end plates 18 of the fuel cell stack 100 are called monopolar plates. Between the polar plates 12 and the respective membrane electrode assemblies 10 are arranged anode and cathode chambers (not shown), which are bounded by circumferential seals 20. In order to produce the sealing function of the seals 20, among other things, the fuel cell stack 100 is compressed (pressed) in the stack direction S by means of a clamping system. The clamping system 110 comprises an outer clamping device 22 as well as a spring system arranged between an outer polar plate and an end plate 18. In order to build external stress, which is transmitted via the spring system to the fuel cell stack, elongated tensile bodies 24 of the outer clamping devices 22 further transmit tensile forces between the two end plates 18 so that the end plates 18 are pulled toward each other by means of the tensile bodies 24. To this end, the tensile bodies 24 extend in a stack direction S of the fuel cell stack 100. The elongated tensile body 24 and at least a portion of the fastening means 26 are integrally formed.

In the embodiment shown, at least one of the clamping devices 22 comprises, in addition to the elongated tensile body 24, at least one fastening means 26 connected to the tensile body 24. The fastening means 26 is designed to fasten at least one component 29 that is adjacent to the fuel cell stack 100. The adjacent component 29 may, for example, be an insulation of the stack or, as illustrated, a cable. The cable may extend from an accumulator to an opposite end of the fuel cell stack 100 and serve to conduct away electrical power of the fuel cell stack 100.

The applied pressure generated by the outer clamping device 22 is typically transmitted to the fuel cell stack 100 via a spring system. The spring system may comprise a plurality of disk springs 40 which are connected to one another in a bonded and/or force-fitting manner.

Figure 2:
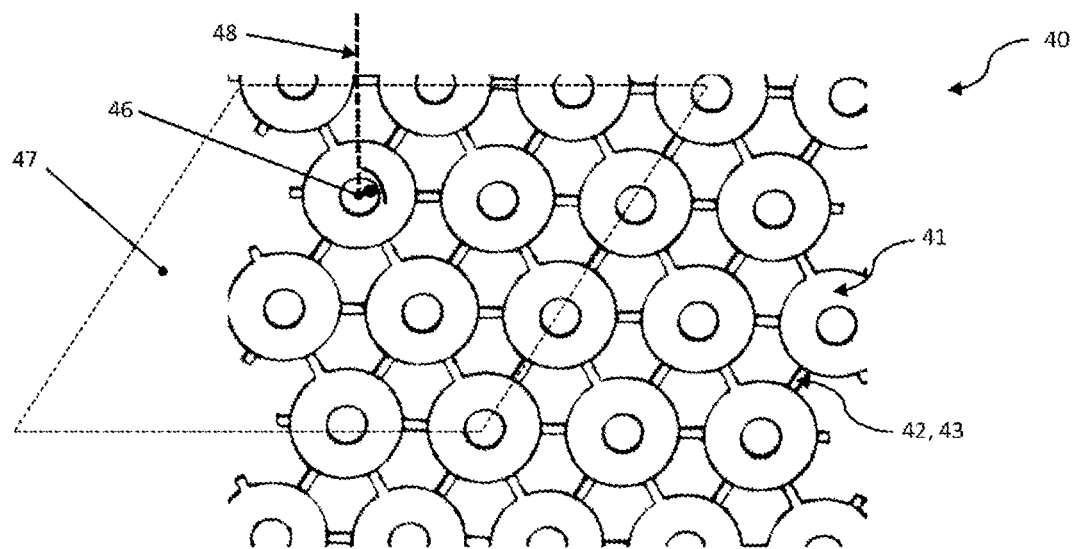
FIG. 2 illustrates a schematic representation of a section of a package.

A section of a spring system (21) is shown in FIG. 2. FIG. 2 shows a plurality of disk springs 40 which are connected to one another in a plane 47 in a bonded and/or force-fitting manner. An embodiment in which the plurality of faults are connected to one another both in a bonded and in a force-fitting manner provides, for example, that some of the disk springs are connected to one another in a bonded manner and others of the disk springs 41 are connected to one another in a form-fitting manner. The plane 47 in which the disk springs 41 are connected to one another is shown in FIG. 2 in plan view. The plane 47 extends perpendicularly to an axis of rotation 48 which in turn runs through the center 46 of a circle described by a disk spring 41.

Figure 3:
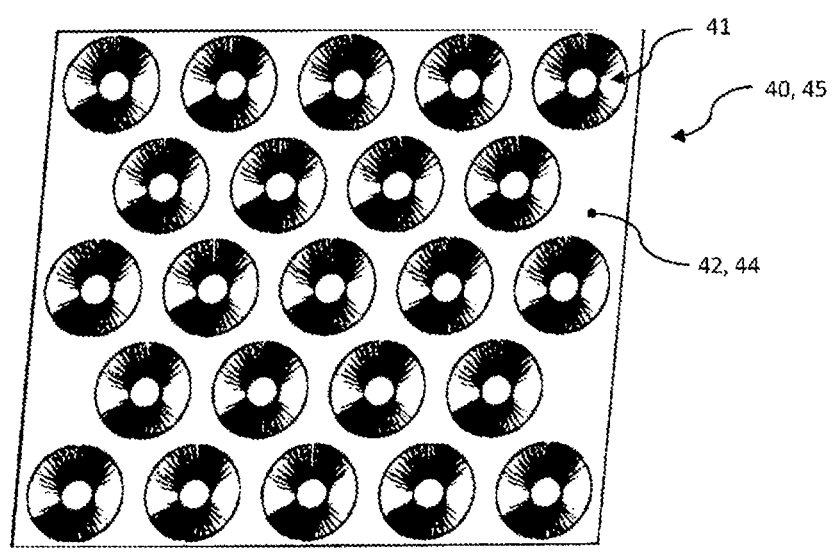
FIG. 3 illustrates a schematic representation of a package having a plurality of disk springs.

The connection 42 between the disk springs 41 may take the form of a web 43 or, in the embodiment shown in FIG. 3, a flat connection 44. In the embodiment shown in FIG. 2, a disk spring 41 is in each case connected to 6 further adjacent disk springs via a web 43. Alternatively, a disk spring is connected to 4 adjacent disk springs via a web 43. The number of connecting webs 42 per disk spring 41 corresponds essentially to the number of adjacent disk springs 41 per disk spring 41.

The embodiment shown in FIG. 3 has, in particular, a full-surface connection 44 of the disk springs 41. The embodiment shown with flat connections 44 between the disk springs 41, in particular in the full-surface connection 44 shown in FIG. 3, leads not only to adjacent disk springs being connected to one another but also to virtually all disk springs of a package 45 having a bonded connection.

FIG. 3 shows a package comprising a plurality of disk springs 40. The number of disk springs 41 arranged next to one another shown along one edge is to be understood merely as an example and in no way as restrictive, and the same applies to the distance between and the arrangement of the disk springs 41 in relation to one another. It is clear that disk springs arranged along the edges of the package 45 have fewer adjacent disk springs 41. The same also applies to packages 45 whose plurality of disk springs 40 are connected to one another via webs 43; disk springs 41 arranged along an edge will then have a reduced number of connections 43 corresponding to their reduced number of neighbors.

The disk springs 41 may have an outer diameter in the range of 0.05 to 2 mm. The distance between the disk springs 41 may be in the range of 40 to 70% of the outer diameter, in particular in the range of 45 to 67%, wherein edge regions of the latter may be used. The stated percentages relate to distances between the centers 46 of disk springs 41.

Figure 4:
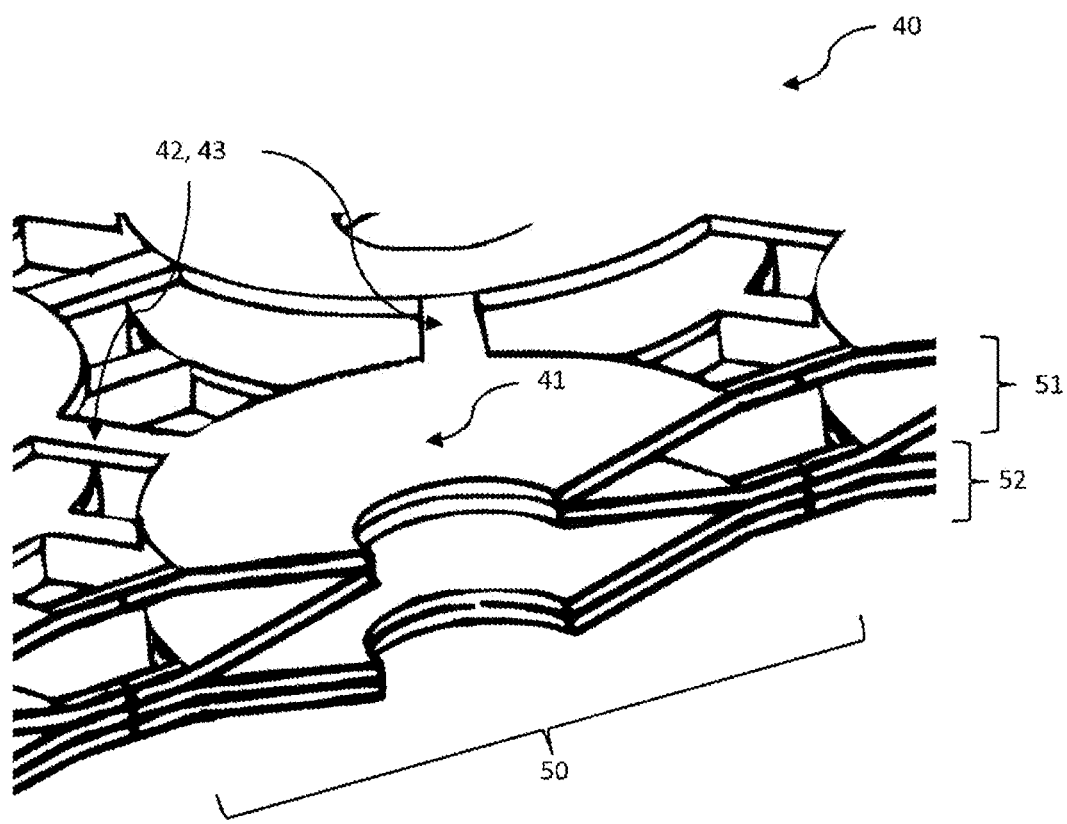
FIG. 4 illustrates a schematic representation of a stack of several packages.

In the arrangement in a fuel cell stack 100, several of the above-described packages 45, which each consist of a plane 47 of a plurality of disk springs 40 connected to one another, may be arranged one above the other, in particular stacked. FIG. 4 shows a schematic sectional representation of such a stack in an oblique sectional view. FIG. 4 shows a section of a package 45 in which adjacent disk springs 41 are connected to one another via a web 43. The features and embodiments shown and described in this context may moreover be correspondingly transferred to packages 45 having flat connections 44 between individual disk springs 41.

The sectional view shows 4 disk springs 41 each stacked one above the other, wherein in the embodiment shown a stack of disk springs 41 in each case comprises two partial stacks 51, 52. By way of example, the stacked disk springs 41 of the first partial stack 51 are arranged alternately, in other words a convexity of the adjacent disk springs 41 in the partial stack 51 is aligned oppositely. As an alternative, a partial stack 52 is shown in which adjacent disk springs 41 in the partial stack 52 are aligned unidirectionally, i.e., their convexity points in the same direction, which results in the surfaces of the disk springs 41 being parallel.

As indicated in FIG. 4, the convexities of the disk springs 41 may be conical, i.e., in the form of a flattened truncated cone. In this case, the lateral surface of the truncated cone forms the disk of the disk springs 41. Alternatively, the disk of the disk springs 41 is formed from a spherical segment, in particular a hemisphere, wherein a circular recess is arranged in the center.

Figure 5:
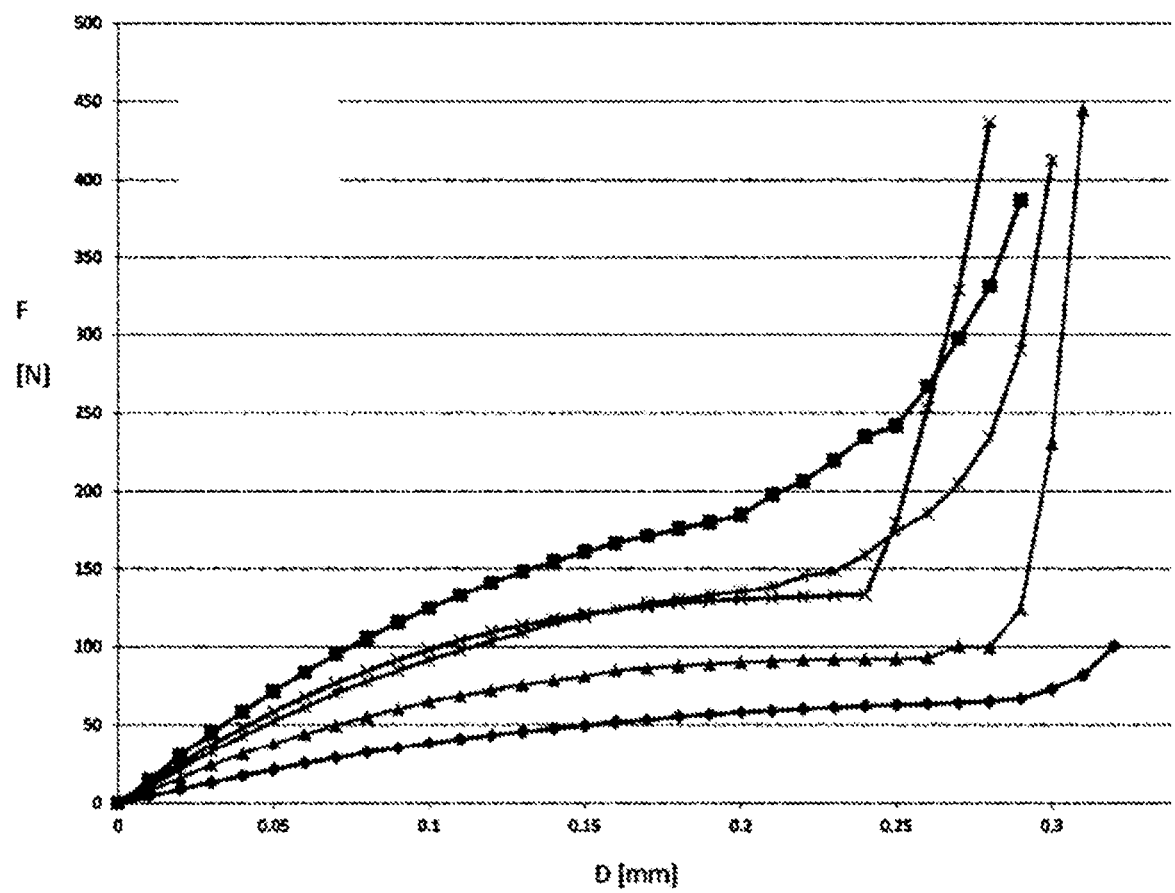
FIG. 5 illustrates a graphical representation of a force vs. spring deflection curve in four embodiments in comparison to a known arrangement.
Figure 6:
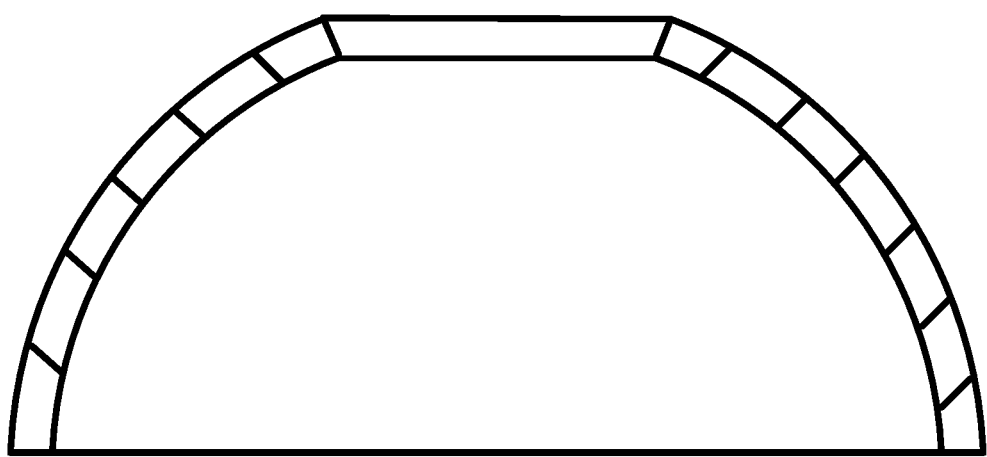
FIG. 6 illustrates a cross-sectional view of a disk spring having a hemispherical shape.

FIG. 5 shows a force/deformation diagram, wherein the deformation of the respective disk springs in millimeters is indicated on the abscissa. In order to determine the deformation, the reduction of a height of the convexity of the disk spring in millimeters is measured. The deformation is related to a force in Newtons acting on the disk springs, wherein the force acting on the disk springs is plotted on the ordinate in the diagram.

The diagram shows 5 curves, wherein the squares correspond to measuring points of a plurality of disk springs which are connected by a flat connection, wherein the distance between the disk springs is in the lower range, in the present case at 45% of the outer diameter of the disk springs. A flat connection is also the basis for the measuring points marked as "X," wherein the distance between the disk springs here is in the range of 67% of the outer diameter of the disk springs. An approximately equal slope, at least in the range of a 0 to 0.25 mm compression of the disk springs, is shown by the measurement of a plurality of disk springs which are connected to one another by webs, wherein the webs are in turn also connected to one another (measuring points marked by a star). The measuring points marked by triangles corresponding to the results of the deformation of a plurality of disk springs which are connected to one another only by webs.

In comparison to the baseline (rectangular measuring points), all four measured embodiments of the connected disk springs according to the embodiments described herein have a steeper curve. With the same material thickness, the connected disk springs are accordingly stiffer for the same force transmission. Accordingly, less material can be used in the embodiments described herein, which in turn leads to a weight reduction.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A clamping system for a fuel cell stack, comprising:
a plurality of disk springs, wherein the disk springs are connected to one another in a disk plane by an integrally one-piece web-like connection, wherein the disk plane is a plane perpendicular to central longitudinal axes of the disk springs, each of the disk springs lies in the disk plane, and each of the connections between disk springs lie in the disk plane, wherein each disk spring is connected to four or six adjacent disk springs, and wherein, in a viewing direction perpendicular to the disk plane, a surface area of the connections between the disk springs is smaller than an area of recesses between the connections and the disk springs.

2. The clamping system according to claim 1, wherein the plurality of disk springs are produced by being stamped out of a piece of material or by molding of a piece of material.

3. The clamping system according to claim 1, comprising at least two layers of plural disk springs, the at least two layers arranged one above the other.

4. The clamping system according to claim 3, wherein the layers are arranged in relation to one another in such a way that the disk springs of layers arranged one above the other are aligned congruently.

5. The clamping system according to claim 4, wherein the disk springs of layers arranged one above the other are aligned at least partially unidirectionally.

6. The clamping system according to claim 1, wherein the disk springs have a conical shape or a spherical-segment shape.

7. A fuel cell stack comprising a clamping system, the clamping system including:
a plurality of disk springs, wherein the disk springs are connected to one another in a disk plane by an integrally one-piece web-like connection, wherein the disk plane is a plane perpendicular to central longitudinal axes of the disk springs, each of the disk springs lies in the disk plane, and each of the connections between disk springs lie in the disk plane wherein each disk spring is connected to four or six adjacent disk springs, and wherein, in a viewing direction perpendicular to the disk plane, a surface area of the connections between the disk springs is smaller than an area of recesses between the connections and the disk springs.

8. The clamping system according to claim 1, wherein the disk springs are arranged hexagonally or rectangularly in relation to one another.

9. The clamping system according to claim 5, wherein the disk springs of layers arranged one above the other are aligned alternatingly unidirectionally and alternately.

10. The clamping system according to claim 6, wherein the disk springs have a hemispherical shape.

* * * * *